SIMPLIFIED TWO-STAGE ERROR-CONTROL DECODER

Filed July 31, 1962

3 Sheets-Sheet 1

Inventors:
Coleman H. Burton,
Michael E. Mitchell,
by D. T. Ready
Their Agent.

SIMPLIFIED TWO-STAGE ERROR-CONTROL DECODER

Filed July 31, 1962 3 Sheets-Sheet 2

Inventors:
Coleman H Burton,
Michael E. Mitchell,
by D. J. Reedy
Their Agent.

SIMPLIFIED TWO-STAGE ERROR-CONTROL DECODER
Filed July 31, 1962
3 Sheets-Sheet 3
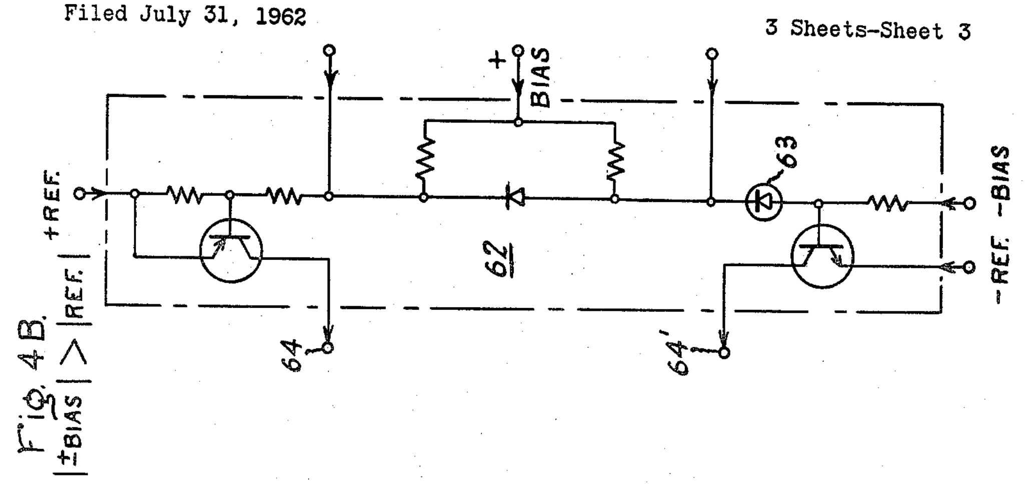
Fig. 4B. |±BIAS| > |REF.|
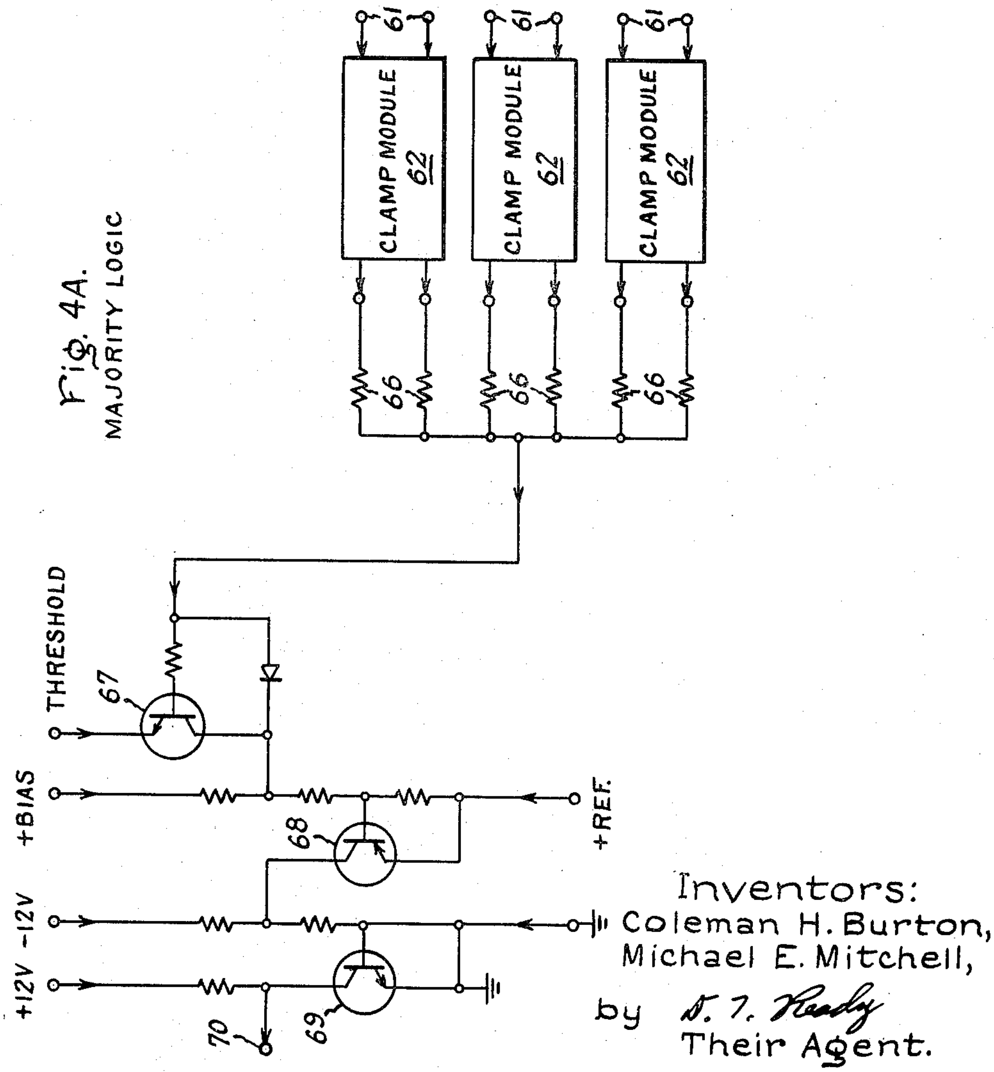
Fig. 4A. MAJORITY LOGIC
Inventors:
Coleman H. Burton,
Michael E. Mitchell,
by [signature]
Their Agent.

United States Patent Office 3,164,804
Patented Jan. 5, 1965

3,164,804
SIMPLIFIED TWO-STAGE ERROR-CONTROL DECODER

Coleman H. Burton and Michael E. Mitchell, Ithaca, N.Y., assignors to General Electric Company, a corporation of New York Filed July 31, 1962, Ser. No. 213,733
3 Claims. (Cl. 340—146.1)

The invention is directed to error correcting apparatus for digital data processing systems. The apparatus is of the class which operates upon (and generates) code words (or sequences of $n$ digits) which are characterized by consisting of $k$ information digits, plus $n-k$ redundant digits whereby errors can be corrected by means of the redundant digits. The apparatus will not correct all possible combinations of errors, but it can correct up to a given number with certainty and some additional errors under special circumstances and perform other related functions such as monitoring the number and rate of error corrections. The invention results in great simplification of apparatus with certain codes.

For many years, a great deal of successful work on the theory of error correcting codes has been carried out. There have also been substantial developments in apparatus for the encoding of many kinds of error correcting codes. However, there has been a distinct lack of success in providing corresponding decoding apparatus of practical simplicity. In fact, prior decoding systems are frequently characterized by marginal increases of overall reliability because the mass of additional decoding apparatus tends to introduce as many errors as it corrects.

In respect to some considerations, the advantage in the use of error correction codes is that by transmitting information over a longer time period at the same power, more energy is made available and thus greater signal-to-noise ratio is obtainable. However, it is necessary to provide the added signal energy in such a manner that there can be efficient discrimination of the information signal. The relations involved can be approached with various kinds of analysis and a very large body of complex theory exists.

For the purposes of explanation, a representative code will be considered in the specification. This code is known as the (7, 4) code. It consists of $n=7$ binary characters or bits of which $k=4$ are the information bits and $n-k=3$ bits are redundant bits which provide an error correcting capability of at least 1 error in each code word.

If one has 4 information bits, there are $2^4$ possible binary combinations or words and there are $2^7$ possible combinations for a 7 bit code. It is evident that the additional redundant digits can provide a great deal of correction data to determine where errors are. In fact, it has been determined that the four information bits can be encoded so that all possible correct word combinations will differ from each other in at least $3(=d)$ places of their seven bit code word. As a result, if a received code word has an error, and it is compared with the $2^4$ correct codes, the closest code word will be the correct one because all other possible correct code words will differ in at least two places.

As is evident, if codes of increased length are used, the increase in equipment complexity tends to be exponential. Most prior systems suggested have been characterized by a fourth power rate of increase of complexity as a function of the code length. This increase in complexity necessarily results in corresponding increases in cost, inflexibility, and other problems associated with complexity.

Briefly stated, the invention consists of techniques for extracting signal from noise plus signal. The techniques are characterized by the fact that the decoding procedure is a bit-by-bit operation in which the following two-step routine is iterated: First, a calculation of the several estimator values for the $i$th transmitted code digit (or for mod 2 sums of selected code digits) wherein each estimator is based on, or may actually consist of, a mod 2 sum of code digits identically equal to the estimated value when no errors are present. Second, a combination of the several estimator values for each estimated quantity are combined into a final estimate, wherein the final estimate for the $(i+1)$th quantity differs from that for the $i$th only by a unit cyclic permutation of the digits (modulo the code length $n$) appearing as arguments in the estimators.

Regarding the second step, the combining operation for binary decoding with an odd number of estimators is merely the majority decision operation. Binary decoding with an even number of estimators is accomplished by deciding according to an arbitrary rule in case of a tie. (And by majority decision otherwise.) If a particular estimator is inherently more reliable for the expected kind of error-producing mechanism, it should obviously be used to break ties. (In most cases, the single-digit estimator is more reliable.) In some cases of equal estimator reliability (or credibility), the best arbitrary rule for breaking ties may be pseudorandom choice, or even truly random choice.

The most significant feature of the invented decoding techniques is not the variety of detailed differences between specific decoding procedures (and their implementation), but instead consists of the fact that each decoding procedure within the scope of the defined invention employs a decoding function which is independent of the particular code digit (or intermedaite binary estimation quantity) being decoded. Thus, in two-stage decoding the mod 2 sum of selected code digits is the intermediate binary estimation quantity which is decoded prior to decoding any of the code digits themselves. In spite of the superficial differences, the inherent reason for the simplicity with which the invented decoding techniques can be implemented is based on the nearly complete exploitation of the cyclic properties of the codes employed.

Accordingly, it is an object of this invention to provide a simplified error correction decoder.

It is a further object of the invention to provide a simplified plural error correction decoder which does not require a plurality of complete storage devices for intermediate logic evaluator operations.

These and other objects and features of the present invention will become apparent from the accompanying detailed description and drawings in which:

FIGURES 4A and 4B are schematic diagrams of a majority logic circuit for the FIGURE 1 decoder.

Figure 1:
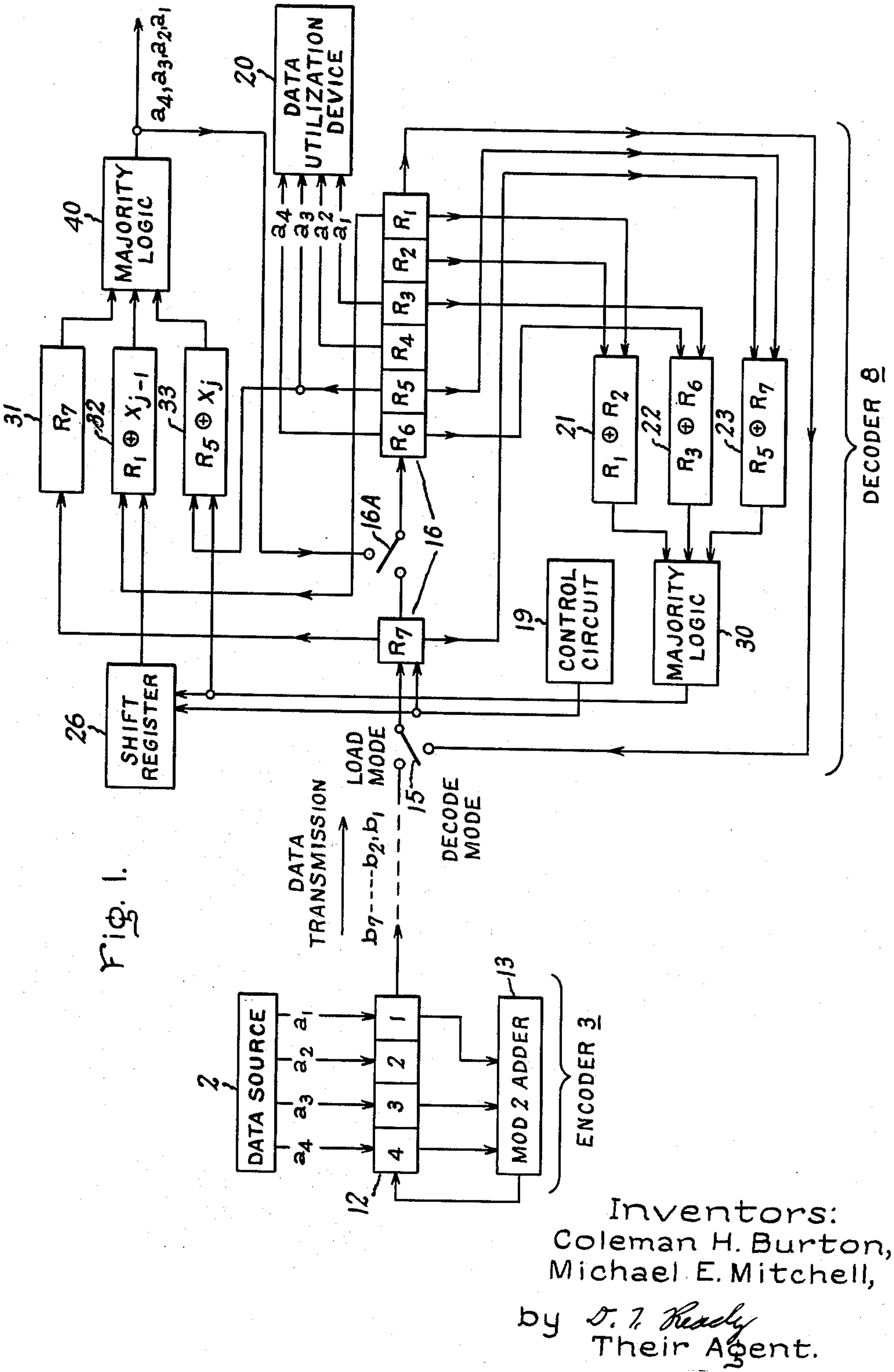
FIGURE 1 is a block diagram of a one-way digital communication system illustrating binary encoding and decoding and includes a block diagram of an encoder and decoder for a (7, 4) code.

Referring now to the drawings, FIGURE 1 is a block diagram of a representative one-way digital communications system. A data source 2 supplies information in the form of digital signals such as data words which it is desired to transmit to a remote data utilization device 20. The data word illustrated is a four digit word $a_1, a_2, a_3, a_4$, which is applied to an encoder 3 in parallel. The output of the encoder 3 is a series of bits $(a_1, a_2, \ldots a_7)$ in which the last three are redundant bits generated by the encoder. These redundant bits are generated as predetermined logic functions of the information bits. The code word is then transmitted as sequential bits and when received it is stored in the decoder 8 by any conventional digital data storage technique. The decoder 8 then operates upon the received word and by sensing the redundant bits (together with the information bits), determines the correct values $a_1$, $a_2$, $a_3$, and $a_4$, which are then applied to the utilization device 20.

The apparatus of FIGURE 1 is characterized by the addition of an encoder and a decoder without modification of the original system components. The result is that system performance can be vastly improved without redesign of the original components of the system. With the novel decoder disclosed herein, the information is read out the decoder during $(d-2+k)$ or $(k+1)$ operations following reception of the code word. This is permitted by minimizing the number of the sequential bit decoding operations to the number of information bits in the encoded word following a single operation to compute the intermediate estimator quantities.

FIGURE 1 includes a block diagram illustrating the major components of the invention arranged for encoding and decoding a 7, 4 code. The encoder 3 is of a conventional design. It is comprised of a four stage shift register 12 which is adapted to receive an information word of four bits in parallel by suitable gating means. The information word is encoded by simultaneously generating redundant bits and reading out the code word bits during cyclic serial operations. Each clock pulse causes the bit signals in each stage to shift to the right to the next stage. The signals from the stage 1 of shift register 12 are the output bit signals of the encoder 3. During each shift operation, a new redundant bit is generated by the modulo 2 adder 13 and is entered into the stage 4 of the shift register 12. The mod 2 adder generates each redundant bit in accordance with the modulo sum of the three bits in the stages where $a_1$, $a_3$, and $a_4$ were originally entered. The mod 2 adder is conveniently a pair of two input mod 2 adders in series in which $a_1$ and $a_3$ are applied to the first and the output of the first and $a_4$ are applied to the second. An appropriate mod 2 adder will be described hereinafter, but it can take any form such as a simplified half adder wherein the sum signal is the output. (The ouput of each modulo 2 adder in operation is the binary sum casting out all carries.)

The result is that after 7 clock pulses, a code word will be generated in which the first four bits are the same as the information bits and the three redundant bits are as follows:

$$a_5=a_1\oplus a_3\oplus a_4$$
$$a_6=a_2\oplus a_4\oplus a_5$$
$$a_7=a_3\oplus a_5\oplus a_6$$

Because of their cyclic characteristics, the redundant bits are serially generated as the code word bits are shifted out of the shift register 12.

The decoder 8 in FIGURE 1 includes six major functional units: a 7-stage shift register 16, a first set of single intermediate estimator logic circuits 21–23, a first majority logic circuit 30, a single stage shift register 26, a second set of estimator logic circuits 31–33, and a second majority circuit 40. A mode switch 15 selects either a load mode or a decode mode by switching the serial input of the shift register 16 either to the incoming code word or to a feedback connection for circulating the register bit signals sequentially. The estimator logic circuits 21–23 are each connected to two-stages of the shift register 16 in accordance with an independent intermediate logic equation. Each of these estimator logic circuits are of the same type as the mod 2 adder 13 in encoder 3. Because of the relations of the redundant bits to the information bits, the intermediate quantities can be estimated from the code bits in several ways which rely on independent selections of the code word bits. In the absence of any errors, the outputs of all the estimator logic circuits are the same. However, in the event of an error, the majority logic circuit 30, since it is arranged to receive the outputs of all estimator logic circuits, provides an output signal in accordance with the majority of estimates. In this embodiment, there are three estimators. This logic operation, used once for each quantity, will always produce a correct majority logic output if there is one error or none in the received code word because at least two of the estimates must be correct.

A control circuit 19 which provides the various digit and synchronization functions causes the shift register 16 to perform shift operations whereby successive intermediate evaluator quantities, $X_j$, are generated by majority circuit 30. These signals are applied to a single stage shift register 26 so that for the second stage operation both the intermediate quantity $X_j$ then generated and the previous quantity $X_{j-1}$ are available. The second stage operates in a manner similar to the first stage. A plurality of bit value estimators 31–33 are provided. The estimates are obtained from the code word bits and the intermediate quantities by the logic indicated in the drawing. The outputs of the estimators are then applied to the majority circuit 40 in the same manner as for majority circuit 30. The majority of the estimates is taken as the decoded bit signal which is fed back to the shift register 16. With four operations (after the first operation), the four decoded data bit signals have been sequentially generated and are made available in parallel by being fed back to shift register 16 through switch 16A.

The sequence of decoding operations in the decode mode is summarized as follows:

(1) Compute the quantity $X_j$ (for $j=0$) as indicated by the first stage logic.

(2) Shift the contents of the seven stage shift register in cyclic fashion (using feedback) one unit to the right, and at the same time shift the quanttiy $X_j$ into the one-stage buffer register.

(3) Compute the quantity $X_j$ and then compute $a_j$ (the estimate of the $j$th information bit) from $X_j$, $X_{j-1}$ and the contents of stages $R_1$, $R_5$, and $R_7$, as indicated by the second stage logic.

(4) Repeat steps 2 and 3 for a total of four complete computations ($j=1, 2, 3, 4$) and then STOP.

This sequence of steps will result in the correct computation of the four transmitted information bits $a_1$, $a_2$, $a_3$, $a_4$ provided that not more than one transmission error has occurred in the received digits $b_1, b_2, \ldots b_7$. The two-stage cascaded decoding procedure is independent of the particular bit being decoded.

The bit-by-bit two-stage decoding technique which has just been described applies with very little modification to all of the cyclic single-error-correcting binary group codes of length $n=2^r-1$, where $r$ is the number of redundant digits. These are usually referred to as the close-packed single-error-correcting cyclic Hamming codes. However, the two-stage cascaded decoding technique is not restricted to single-error-correcting codes. For example, it also applies to a well-known family of cyclic binary group codes having length $n=2^{k-1}-1$, where $k$ is the number of information bits. These codes are called augmented m-sequence codes, and have a guaranteed error correctability of $[(n+1)/4]-1$.

Figure 2:
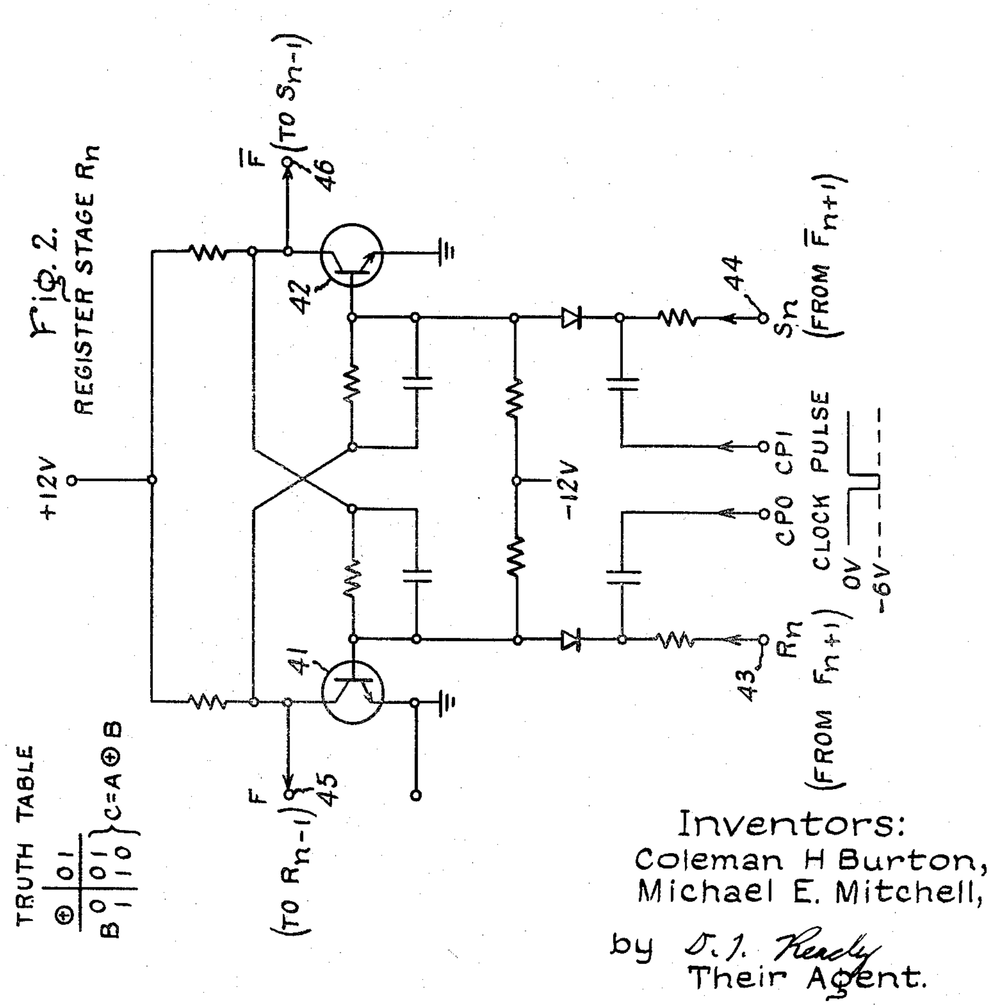
FIGURE 2 is a schematic diagram of one stage of a shift register suitable for use in the FIGURE 1 encoder or decoder.

The implementation of the FIGURE 1 decoder may be carried out with conventional components. For example, the shift registers 12 and 16 can be implemented by a series of standard flip-flops such as shown in FIGURE 2. Each flip-flop $R_n$ is a single stage in the shift register and is interconnected with the adjoining stages $R_{n+1}$ and $R_{n-1}$. In the preferred embodiment of the system, a "1" bit signal is in the form of a positive voltage and a "0" bit is in the form of a zero voltage level. Therefore, the n-p-n transistors 41 and 42 are interconnected so that when the flip-flop is "set," the right-hand transistor 42 is conducting and the left-hand transistor 41 is off. Accordingly, a positive voltage appears at the output terminal 45 as F and a zero voltage appears at the complementary output terminal 46 as $\overline{F}$. When the negative going clock pulse is applied to the base of each transistor, the conducting transistor is cut off. Upon removal of the clock pulse, the flip-flop circuit assumes a "set" or "reset" state in accordance with the last state of the preceding stage. That is, the output signals of the stage $R_{n+1}$ are connected to input terminals 43 and 44 so that $S_n=F_{n+1}$ (before the shift) and $R_n=\overline{F}_{n+1}$.

Figure 3:
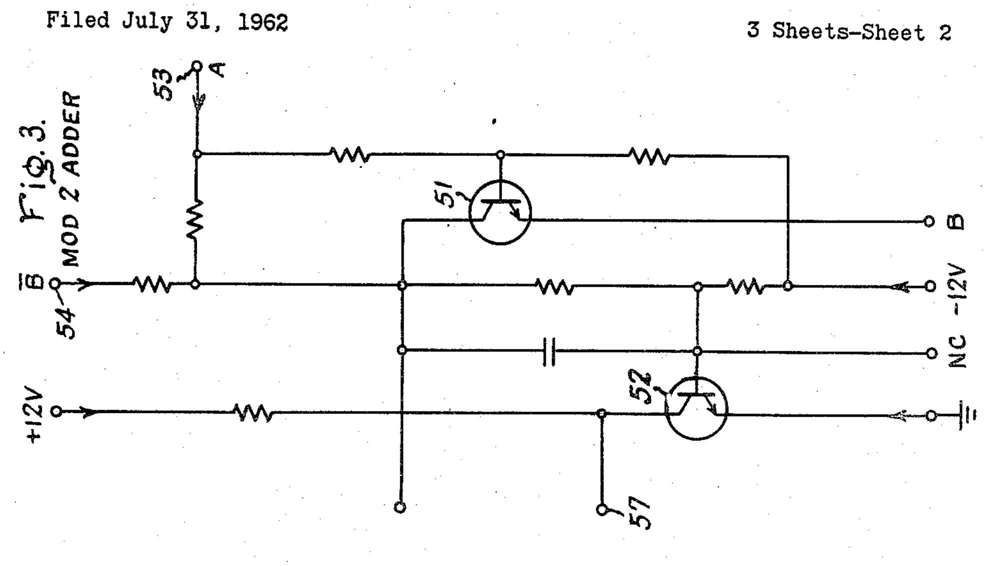
FIGURE 3 is a schematic diagram of a two-input modulo 2 adder for the estimator logic circuits in the FIGURE 1 decoder.

A suitable component for the mod 2 adder is shown in FIGURE 3. The illustrated circuit is a two-input mod 2 adder in itself and has its output coupled to one of the inputs of an identical two-input mod 2 adder to provide the three-input adder 13. The n-p-n transistors 51 and 52 operate to produce a positive voltage at the output terminal 57 in accordance with an "exclusive or" logic function. If either input, A at input terminal 53 or B and $\overline{B}$ at input terminals 54 and 54', is a "1" the output at terminal 57 is a positive vlotage and if the inputs are both either "1's" or "0's," the output signal is a zero voltage. This is because the transistor 52 is conducting only if $\overline{B}$ and A provide positive voltages or if B provides a positive voltage while A provides a zero voltage.

FIGURES 4A and 4B illustrate a suitable majority logic circuit. This circuit receives the output of all the estimator logic circuits 21–23 or 31–33 at input terminals 61. Since it combines all of the input signals into an analog signal, it is fundamental that these signals be accurate voltages so that a correct comparison is made. Accordingly, clamping circuits 62 are provided to regulate the comparison voltages. Each clamping circuit includes a zener diode 63 which produces a voltage reference for a standard transistor clamping circuit. Because of the balanced reference and bias sources, the voltage at one of the clamping circuit output terminals 64 and 64' is negative or positive and the other is zero. These carefully referenced signals (negative for a "1" estimation and positive for a zero estimation) are then applied to a set of precision summing resistors which sum the signals. The output of the summing network can assume any one of three levels. Accordingly, an output circuit consisting of three transistors 67, 68 and 69 is provided so that the output signal of the majority logic circuit at terminal 70 assumes either a zero value for a "0" bit or a positive signal value for a "1" bit of the decoder circuits. The transistors 68 and 69 therefore produce either a fixed positive voltage or a zero voltage depending upon whether transistor 67 is turned on or off by the majority sum of the estimator signals. The output voltage remains constant regardless of variations in the transistor 67 current. It is to be understood that in decoders having an even number of estimators, the "majority" decision would include tie-breaking functions such as selection of the $b_j$ value to be decoded.

The construction of the decoder can be carried out with other standard components. For example, binary scaler counters can be used as the modulo 2 adders and other shift registers such as magnetic core shift registers can be employed. While particular embodiments of the invention have been shown and described herein, it is not intended that the invention be limited to such disclosure, but that changes and modifications can be made and incorporated within the scope of the claims.

We claim:

1. In data processing apparatus that processes code words having $n$ binary digits in $n$ respective positions in the word, of which $k$ digits represent information bits, a decoder comprising:

(*a*) register storage means connected to receive the code words in such a manner that the bits of the code words are entered into positions of the register means corresponding to their position in the code word and to cyclically shift the stored bits;

(*b*) a first set of cyclic estimation logic circuits each of which computes the mod 2 sum of certain received bits in said shift register in a manner to provide a plurality of independent estimation signals for the correct value of an intermediate binary estimation quantity;

(*c*) a first logic circuit responsive to the intermediate estimate signals to provide an output bit signal in accordance with the predominant estimate signals;

(*d*) a second set of cyclic estimation circuits which computes the mod 2 sum of certain received bits and said intermediate estimation quantities to provide a plurality of independent estimation signals for the correct value of successive bits;

(*e*) a second majority logic circuit responsive to the estimate signals from said second set of estimation circuits to provide an output bit signal in accordance with the predominant estimate signals; and (*f*) control circuitry to cyclically shift the bits in said register storage means for $(d-2+k)$ bit decoding operations, to initiate a bit decoding operation after each shift, and to command information readout after shift operations.

2. In data processing apparatus that processes code words having $n$ binary digits in $n$ respective positions in the word, of which $k$ digits represent information bits, a decoder comprising:

(*a*) a shift register connected to receive the code words in such a manner that the bits of the code words are entered into positions of the shift register corresponding to their position in the code words;

(*b*) a first set of cyclic estimation logic circuits each of which computes the mod 2 sum of certain received bits in said shift register in a manner to provide the required number of independent estimation signals for the correct value of an intermediate binary estimation quantity;

(*c*) a first majority logic circuit responsive to the estimate signals to provide an output bit signal in accordance with the majority of the estimate signals;

(*d*) a second set of cyclic estimation circuits which computes the mod 2 sum of certain received bits and said intermediate estimation quantities to provide the required number of independent estimation signals for the correct value of particular code bits;

(*e*) a second majority logic circuit responsive to the estimate signals from said second set of estimation circuits to provide an output bit signal in accordance with the majority of these estimate signals; and (*f*) control circuitry to cyclically shift the bits in said shift register for $(d-2+k)$ bit decoding operations, to initiate a bit decoding operation after each shift, and to command information readout after shift operations.

3. In data processing apparatus that processes code words having 7 binary digits in 7 respective positions in the word, of which 4 digits represent information bits, a decoder comprising:

(*a*) a shift register connected to receive the code words in such a manner that the bits of the code words are entered into positions of the shift register corresponding to their position in the code words;

(*b*) a first set of cyclic estimation logic circuits each of which computes the mod 2 sum of certain received bits in said shift register in a manner to provide the required number of independent estimation signals for the correct value of an intermediate binary estimation quantity as follows:

$$E_1=R_1\oplus R_2$$
$$E_2=R_3\oplus R_6$$
$$E_3=R_5\oplus F_7;$$

(*c*) a first majority logic circuit responsive to the estimate signals to provide an output bit signal in accordance with the majority of the estimate signals;

(*d*) a second set of cyclic estimation circuits which computes the mod 2 sum of certain received bits and said intermediate estimation quantities to provide the required number of independent estimation signals for the correct value of particular code bits as follows:

$F_1 = R_7$
$F_2 = R_1 \oplus X_{j-1}$
$F_3 = R_5 \oplus X_j$;

(*e*) a second majority logic circuit responsive to the estimate signals from said second set of estimation circuits to provide an output bit signal in accordance with the majority of these estimate signals; and (*f*) control circuitry to cyclically shift the bits in said shift register for $(k+l)$ bit decoding operations, to initiate a bit decoding operation after each shift, and to command information readout after shift operations.

No references cited.

UNITED STATES PATENT OFFICE
Certificate of Correction

Patent No. 3,164,804 January 5, 1965

Coleman H. Burton et al.

It is hereby certified that error appears in the above numbered patent requiring correction and that the said Letters Patent should read as corrected below.

Column 6, line 68, for "$E_3=R_5 \oplus F_7$" read —$E_3=R_5 \oplus R_7$—; column 8, line 4, for "$(k+l)$" read —$(k+1)$—.

Signed and sealed this 18th day of May 1965.

[SEAL]

Attest:

ERNEST W. SWIDER,
*Attesting Officer.*

EDWARD J. BRENNER,
*Commissioner of Patents.*